United States Patent
Winkel et al.

(10) Patent No.: US 10,877,765 B2
(45) Date of Patent: Dec. 29, 2020

(54) APPARATUSES AND METHODS TO ASSIGN A LOGICAL THREAD TO A PHYSICAL THREAD

(71) Applicant: Intel Corporation, Santa Clara, CA (US)

(72) Inventors: Sebastian Winkel, Los Altos, CA (US); Ethan Schuchman, Santa Clara, CA (US); Rainer Theuer, Sehnde (DE); Gregor Stellpflug, Braunschweig (DE); Tyler N. Sondag, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 781 days.

(21) Appl. No.: 14/644,130

(22) Filed: Mar. 10, 2015

(65) Prior Publication Data
US 2016/0266905 A1     Sep. 15, 2016

(51) Int. Cl.
| | | |
|---|---|---|
| *G06F 9/30* | (2018.01) | |
| *G06F 9/38* | (2018.01) | |
| *G06F 8/52* | (2018.01) | |
| *G06F 9/50* | (2006.01) | |
| G06F 9/455 | (2018.01) | |

(52) U.S. Cl.
CPC ............. *G06F 9/3851* (2013.01); *G06F 8/52* (2013.01); *G06F 9/3017* (2013.01); *G06F 9/50* (2013.01); *G06F 9/4552* (2013.01)

(58) Field of Classification Search
None
See application file for complete search history.

(56) References Cited

U.S. PATENT DOCUMENTS

| | | | |
|---|---|---|---|
| 8,205,200 B2 * | 6/2012 | Liao | G06F 9/485 |
| | | | 712/220 |
| 9,274,799 B1 | 3/2016 | Winkel et al. | |
| 2016/0274944 A1 | 9/2016 | Winkel et al. | |

OTHER PUBLICATIONS

Keith I. Farkas et al., "The Multicluster Architecture:Reducing Processor Cycle Time Through Partitioning", WRL Research Report 98/8, COMPAQ Western Research Laboratory, 250 University Ave., Palo Alto, CA 94301 USA, Jul. 1998, 1-30 pages.
Amirali Baniasadi et al., "Instruction Distribution Heuristics for Quad-Dynamically-Scheduled, Superscalar Processors", 0-7695-0924-X/00 $10.00 © 2000 IEEE, pp. 337-347.
(Continued)

*Primary Examiner* — Corey S Faherty
(74) *Attorney, Agent, or Firm* — Nicholson De Vos Webster & Elliott LLP

(57) ABSTRACT

Methods and apparatuses relating to assigning a logical thread to a physical thread. In one embodiment, an apparatus includes a data storage device that stores code that when executed by a hardware processor causes the hardware processor to perform the following: translating an instruction into a translated instruction, assigning a logical thread for the translated instruction, and providing a thread map hint for the translated instruction; and a hardware scheduler to assign a physical thread of the hardware processor to execute the logical thread based on the thread map hint.

24 Claims, 12 Drawing Sheets

(56) References Cited

OTHER PUBLICATIONS

Satish Narayanasamy et al., "A Dependency Chain Clustered Microarchitecture", Department of Computer Science and Engineering, University of California, Sari Diego, Microarchitecture Research Lab, Intel Corporation, IEEE International Parallel and Distributed Processing Symposium, Apr. 2005, pp. 1-10.
Canal R., et al., "Dynamic Cluster Assignment Mechanisms," Departament d'Arquitectura de Computadors, Universitat Politecnica de Catalunya, Jordi Girona, 1-3 Modul D6, 08034 Barcelcma, Spain,{rcanal,Jmanel,antonio} @ac.upc.es, 2000, 10 pages.
Ramon Canal et al,"A Cost-Effective Clustered Architecture", 1999, 9 pages.
Subbarao Palacharla et al, "Complexity-Effective Superscaler Processors", 1997, 13 pages.

* cited by examiner

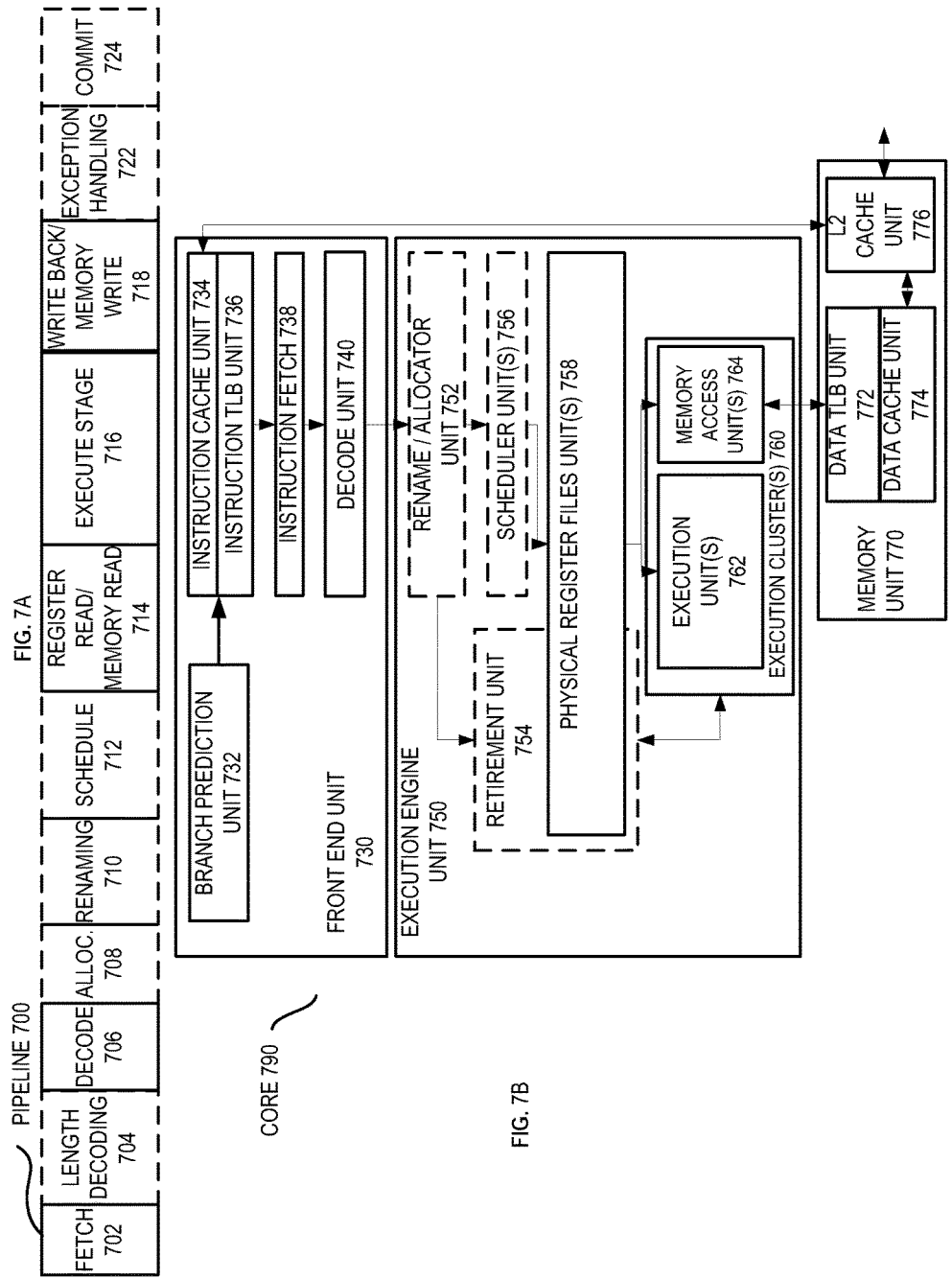

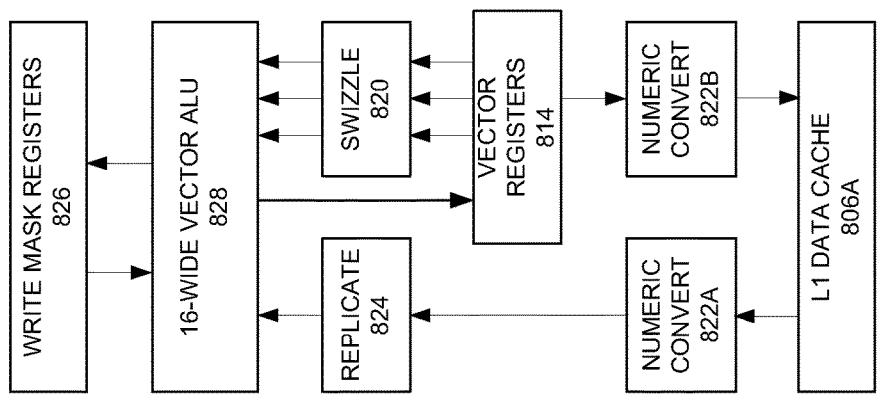
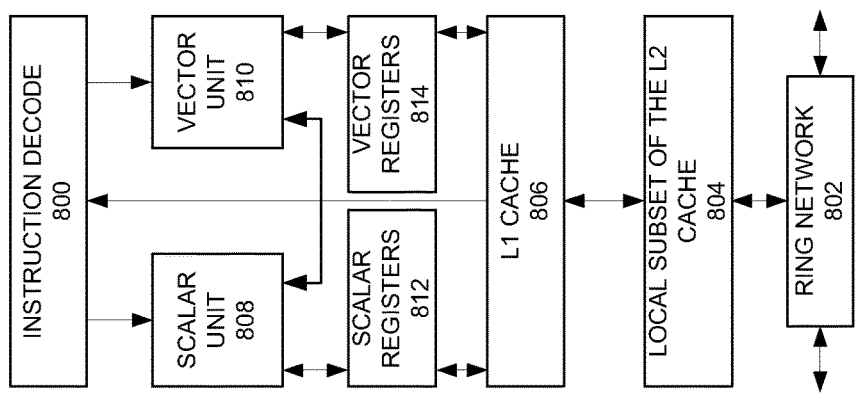

APPARATUSES AND METHODS TO ASSIGN A LOGICAL THREAD TO A PHYSICAL THREAD

TECHNICAL FIELD

The disclosure relates generally to electronics, and, more specifically, an embodiment of the disclosure relates to assigning a logical thread to a physical thread of a processor.

BACKGROUND

A processor, or set of processors, executes instructions from an instruction set, e.g., the instruction set architecture (ISA). Instructions (e.g., code) to be executed may be separated into multiple threads for execution by various processor resources. Multiple threads may be executed in parallel. Further, a processor may utilize out-of-order execution to execute instructions, e.g., as the input(s) for such instructions are made available. Thus, an instruction that appears later in program order (e.g., in code sequence) may be executed before an instruction appearing earlier in program order.

BRIEF DESCRIPTION OF THE DRAWINGS

The present disclosure is illustrated by way of example and not limitation in the figures of the accompanying drawings, in which like references indicate similar elements and in which:

FIG. 7A is a block diagram illustrating both an exemplary in-order pipeline and an exemplary register renaming, out-of-order issue/execution pipeline according to embodiments of the disclosure.

FIG. 7B is a block diagram illustrating both an exemplary embodiment of an in-order architecture core and an exemplary register renaming, out-of-order issue/execution architecture core to be included in a processor according to embodiments of the disclosure.

FIG. 8A is a block diagram of a single processor core, along with its connection to the on-die interconnect network and with its local subset of the Level 2 (L2) cache, according to embodiments of the disclosure.

FIG. 8B is an expanded view of part of the processor core in FIG. 8A according to embodiments of the disclosure.

DETAILED DESCRIPTION

Figure 1:
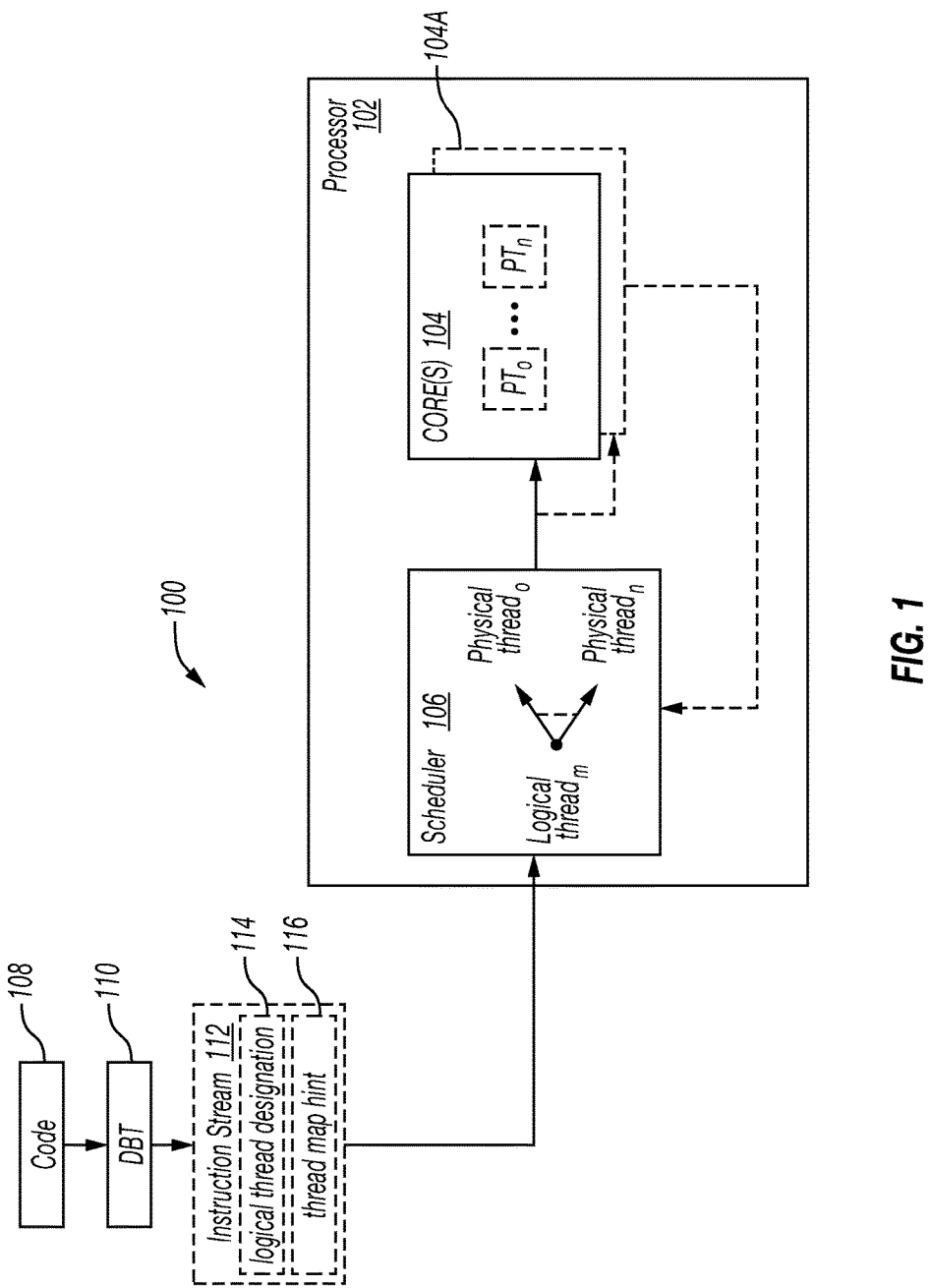
FIG. 1 illustrates a system to assign a logical thread to a physical thread according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decode unit (decoder) decoding macro-instructions. A processor (e.g., having one or more cores to decode and/or execute instructions) may operate on data, for example, in performing arithmetic, logic, or other functions.

Instructions may be separated into different threads (e.g., threads of execution). A thread may generally refer to the smallest sequence (e.g., stream) of instructions that may be managed together, e.g., by a scheduler, for execution. In one embodiment, a thread may be a sequence (e.g., stream) of instructions that are managed independently for execution. In one embodiment, a thread may be a sequence (e.g., stream) of instructions having a data dependency with instruction(s) in a different thread(s). A scheduler may be a hardware scheduler of a processor to schedule execution of instructions on a core of the processor. One embodiment of this disclosure includes a system to schedule execution of instructions on a processor, e.g., a physical thread thereof. A system to schedule execution of instructions on a processor may include hardware, software, firmware, or any combination thereof. A logical thread may generally refer to the thread that is visible from (e.g., managed by) the code. A physical thread may generally refer to the physical components of a processor that execute the logical thread.

One embodiment of this disclosure includes scheduling (e.g., pre-scheduling before run time) an instruction(s) for execution and/or assigning logical threads (LTs) for an instruction(s). Scheduling (e.g., pre-scheduling) may occur at or after translation time, for example, for code translated from one format to another format. A (e.g., dynamic) binary translator may be utilized to translate code (e.g., an instruction) from one format to another format. A binary translator may translate code (e.g., an instruction) from a guest format to a host format. A binary translator may translate an instruction of a first ISA into an instruction of a second ISA. A binary translator may translate (e.g., an x86 format) macro-instruction(s) into micro-instruction(s). An instruction may translate into a plurality of translated instructions, e.g., a one-to-one correspondence is not required in one embodiment. Multiple instructions may translate into one translated instruction or a number of translated instructions that is less than the number of multiple (e.g., untranslated) instructions, e.g., a one-to-one correspondence is not required in one embodiment. A binary translator may translate a software instruction (e.g., in binary code) into a hardware instruction (e.g., in binary code), for example, for execution on a hardware processor. A (e.g., dynamic) binary translator may include hardware, software, firmware, or any combination thereof.

A dynamic binary translator may translate one instruction (e.g., in source binary code complying with the architecture of a source processor (source architecture)) into a translated instruction (e.g., into target binary code complying with the architecture of a target processor (target architecture)). The dynamic binary translation process may take place during execution of the source binary code (e.g., at run time).

A (e.g., dynamic) binary translator may schedule (e.g., schedule before run time) an instruction and/or assign a logical thread for the instruction. A (e.g., dynamic) binary translator may provide a thread map hint (e.g., field) for an (e.g., translated) instruction. A (e.g., hardware) scheduler may assign a physical thread of a (e.g., hardware) processor to execute the logical thread based on the thread map hint.

In certain embodiments after translation and static code scheduling, a binary translator (e.g., a dynamic binary translator (DBT)) assigns instructions from the code into logical threads (LTs). Instructions may be assigned to a particular logical thread according to a variety of policies. For example, instructions that may be executed as a single block (e.g., stream) of instructions placed into the same logical thread, e.g., see the discussion of FIGS. 3A-3C below. For example, instructions in a basic block (e.g., a block of instructions with a single entry point and a single exit point, such as, but not limited to, a sequence of non-branch instructions that ends with a single branch instruction) may be placed in the same logical thread. In one embodiment, the branch at the end of a basic block may jump back to the beginning of the block (e.g., a single-block loop) and the instructions within the block may be (a), (b), (c), and (d), where (d) is the branch instruction that jumps back to (a). When this block of instructions is executed in-order on a processor, the execution order may be (a)(b)(c)(d) then (a)(b)(c)(d), etc. A thread assignment policy of this disclosure may include assigning all instructions [(a)(b)(c)] except for the branch into a single (e.g., rotating) logical thread (e.g., $LT_1$) and assigning the branch instruction (d) into a single (e.g., fixed) logical thread (e.g., $LT_4$) along with a thread map hint to indicate (e.g., to the scheduler) to rotate the physical thread used to execute the non-branch instructions [(a)(b)(c)] on their next execution. In this embodiment, each iteration of the non-branch instructions [(a)(b)(c)] of the loop may be assigned to a different physical thread, e.g., so that the scheduler may execute instructions from different iterations of the loop in parallel. In one embodiment, different iterations of non-branch instructions may be independent of one another for parallel (e.g., concurrent) execution (e.g., on different physical threads). In one embodiment, different iterations of the same instruction(s) may be given a thread map hint to indicate parallel (e.g., concurrent) execution on separate physical threads (e.g., to assign a different physical thread for each iteration of the same instruction(s)).

Certain scheduling decisions may be made (e.g., once) statically (e.g., at translation time in a DBT) which may be more desirable (e.g., power efficient) than making these scheduling decisions repeatedly in a (e.g., hardware) scheduler, for example, (e.g., separately) scheduling each instruction inside of a thread for execution. Scheduler (e.g., hardware scheduler) may be utilized to (e.g., only) make scheduling decisions for certain instructions (e.g., code segments), for example, for instructions where static (e.g., translation time) prediction of their behavior is difficult or unknown (e.g., instructions that depend from a different thread such as, but not limited to, branch instructions). Binary translator (e.g., a software binary translator) assigned threads may have more visibility into future and/or previous instructions than a (e.g., hardware) scheduler. Binary translator (e.g., a software binary translator) may detect critical path instructions and optimize (e.g., logical) thread assignment to prioritize these critical instructions. In one embodiment, a critical path instruction is a load from memory where multiple (e.g., subsequent in program order) instructions are to use the value from that load from memory. A binary translator may prioritize (e.g., mark for the earliest execution possible) that critical memory load. Binary translator (e.g., a software binary translator) may detect dependence instructions (e.g., chains) feeding control flow instructions to prioritize the dependence instructions. Binary translator (e.g., a software binary translator) may not utilize (e.g., require) collection (e.g., offline) of traces to perform (e.g., logical) thread assignment. In one embodiment, by not utilizing traces, thread assignments are not tied to a single input (e.g., not input sensitive) and/or a programmer may not need to perform the extra step of tracing and compilers may not need to be modified and programs recompiled to support a trace-based solution. In an embodiment where a dynamic binary translator is utilized, the (e.g., logical) thread assignment may be adapted at run time to improve performance, for example, where static techniques have no or limited visibility into run time behavior. Certain embodiments of this disclosure are optimized for observed run time behavior. Certain embodiments of this disclosure may dynamically adapt the assignment of a logical thread to a physical thread based on behavior observed (e.g., by a dynamic binary translator) at run time.

In one embodiment, a (e.g., dynamic) binary translator and a (e.g., hardware) scheduler cooperate to translate (e.g., each) logical threads into (e.g., each) physical threads. For example, for different executions of the same stream of instructions (e.g., code), a same instruction may use different physical threads for each execution even though the instructions were statically assigned to logical threads. This may be useful for eliminating false ordering constraints, for example, that may arise from a pure software thread assignment (e.g., where instructions (e.g., loop) may have the same physical thread assignment in each iteration of executing the instructions (e.g., loop)). This may lead to no or minimal instruction level parallelism (ILP) across loop iterations.

FIG. 1 illustrates a system 100 to assign a logical thread to a physical thread according to embodiments of the disclosure. Depicted processor 102 includes a core 104 and optionally a second core 104A. A processor may include one or more cores. A (e.g., each) core may include one or more physical threads (PTs), e.g., to execute an instruction or a thread of instructions. A physical thread may generally refer to a (e.g., smallest) sequence (e.g., stream) of instructions that may be managed (e.g., independently) by physical resources of a processor. For example, a single core 104 may support the execution of one physical thread, two physical threads, or any plurality of physical threads (e.g., as illustrated by $PT_0 \ldots PT_n$ in FIGS. 1 and 2, where n may be any positive integer). Scheduler 106 may be a part of processor 102 (e.g., as depicted) or a separate component (e.g., hardware component).

Code (e.g., binary code) 108 may be translated (e.g., by dynamic binary translator (DBT) 110) from a first (e.g., untranslated) format to a second (e.g., translated) format. DBT 110 may be in hardware, software, firmware, or a combination thereof. In one embodiment, an instruction stream (e.g., translated instruction stream 112) may be output from DBT 110 and include a logical thread assignment (e.g., logical thread designation 114) and/or a thread map hint 116, for example, as a field in an (e.g., translated) instruction. Each instruction in an instruction stream may include a respective logical thread assignment (e.g., logical thread designation 114) and/or a thread map hint 116. A logical thread designation may indicate the particular logical thread that a translated instruction(s) is assigned. Assigning may refer to being a member of a thread of execution. Scheduler 106 may assign a physical thread (e.g., $PT_0 \ldots PT_n$ in FIG. 1) of the processor 102 for the execution of the translated instruction, for example, based on a logical thread assignment (e.g., logical thread designation 114) and/or a thread map hint 116, e.g., as a field in an (e.g., translated) instruction or thread. Dotted line extending between core 104 and scheduler 106 is an optional data path that may provide an indication to the scheduler 106, for example, that a physical thread is available to execute a (e.g., logical) thread. A single headed arrow herein may not be limited to one-way communication, for example, it may indicate two-way communication (e.g., both to and from that component).

Figure 2:
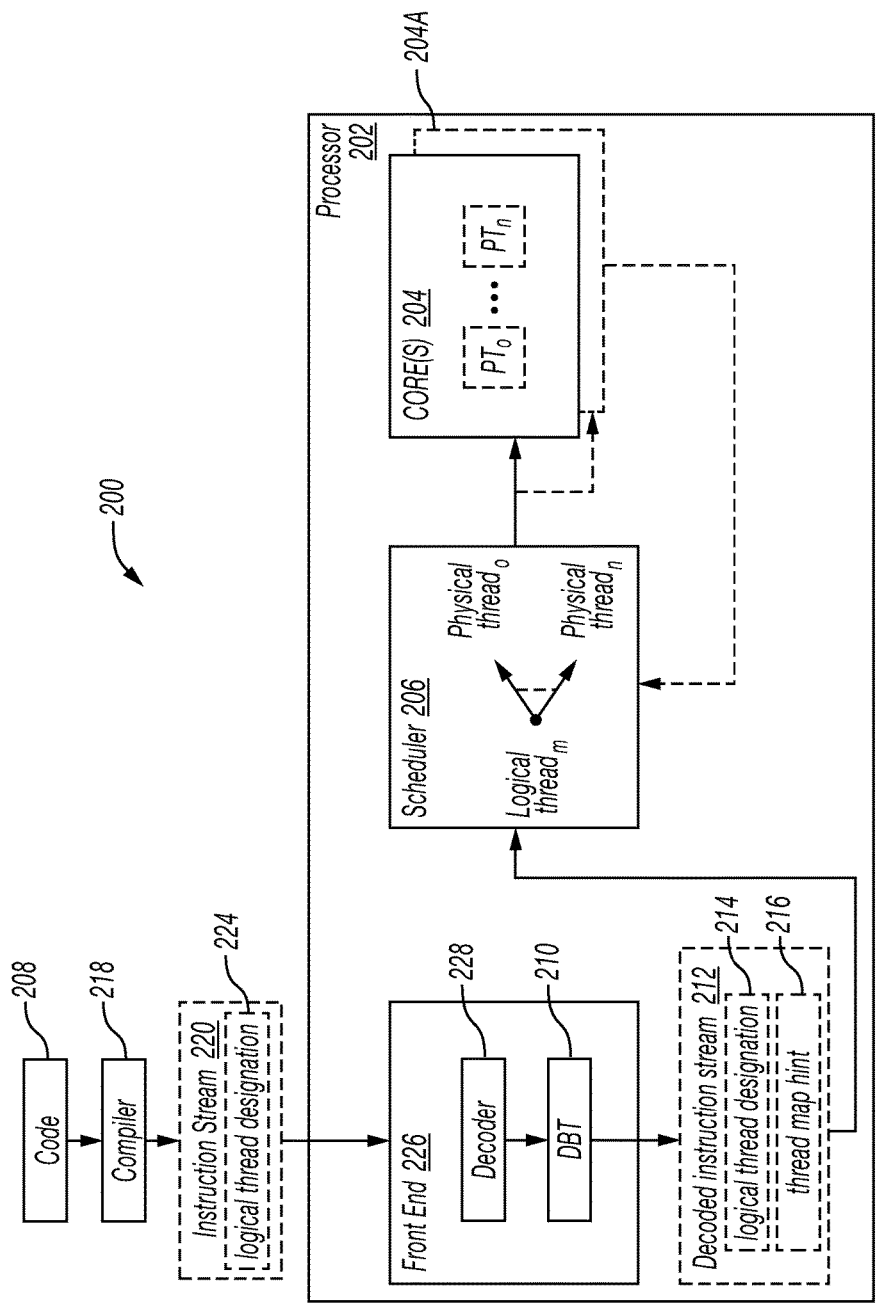
FIG. 2 illustrates a system to assign a logical thread to a physical thread according to embodiments of the disclosure.

FIG. 2 illustrates a system 200 to assign a logical thread to a physical thread according to embodiments of the disclosure. Depicted processor 202 includes a core 204 and optionally a second core 204A. A processor may include one or more cores. A (e.g., each) core may include one or more physical threads (PTs), e.g., to execute an instruction or a thread of instructions. A physical thread may generally refer to a (e.g., smallest) sequence (e.g., stream) of instructions that may be managed (e.g., independently) by physical resources of a processor. For example, a single core 204 may support the execution of one physical thread, two physical threads, or any plurality of physical threads (e.g., as illustrated by $PT_0 \ldots PT_n$ in FIGS. 1 and 2, where n may be any positive integer). Scheduler 206 may be a part of processor 202 (e.g., as depicted) or a separate component (e.g., hardware component).

Code (e.g., binary code) 208 may be compiled (e.g., by a compiler 218), for example, code 208 may be source code (e.g., written in a programming or source language) and compiler may translate the source code into another computer language (e.g., the target machine language). Compiler may output a compiled instruction (e.g., as instruction stream 220). Compiler or other component may output a logical thread assignment (e.g., logical thread designation 224), for example, as a field in an (e.g., compiled) instruction or thread. A logical thread designation may indicate the particular logical thread that a translated instruction(s) is assigned. Assigning may refer to being a member of a thread of execution.

Each instruction in an instruction stream may include a respective logical thread assignment (e.g., logical thread designation 214). An instruction (e.g., of instruction stream 220) may be output to the processor 202, e.g., a front end 226 of the processor 202. Front end 226 may fetch and prepare instructions to be used by other components of processor 202. Processor may include a dynamic binary translator (DBT) as a separate component (not shown) or as a component of front end 226, e.g., as depicted in FIG. 2. Front end 226 may include a decoder 228 (e.g., an instruction decoder to decode an instruction into the control signals (e.g., micro-instructions) to control the execution of the instruction). Decoder may output decoded code (e.g., a decoded instruction) to a binary translator (e.g., DBT 210 of processor 202). Binary translator (e.g., DBT 210) may translate an instruction (e.g., from instruction stream 220) from a first (e.g., untranslated) format to a second (e.g., translated) format. In one embodiment, an instruction stream (e.g., translated, decoded instruction stream 212) may be output from DBT 210 and may include a logical thread assignment (e.g., logical thread designation 214) and/or a thread map hint 216. A logical thread designation may indicate the particular logical thread that a translated instruction(s) is assigned. Assigning may refer to being a member of a thread of execution.

Each instruction in an instruction stream may include a respective logical thread assignment (e.g., logical thread designation 214) and/or a thread map hint 216, for example, as a field in an (e.g., compiled and decoded) instruction. Logical thread assignment output from a compiler (e.g., as logical thread designation 224) and from a DBT (e.g., as logical thread designation 214) may be the same or different, for example, if the DBT may perform a logical thread assignment. Scheduler 206 may assign a physical thread (e.g., $PT_0 \ldots PT_n$ in FIG. 2) of the processor 202 for the execution of the translated instruction, for example, based on a logical thread assignment (e.g., logical thread designation 214) and/or a thread map hint 216, e.g., as a field in an (e.g., translated) instruction or thread. Dotted line extending between core 204 and scheduler 206 is an optional data path that may provide an indication to the scheduler 206 that a physical thread is available to execute a (e.g., logical) thread. A single headed arrow herein may not be limited to one-way communication, for example, it may indicate two-way communication (e.g., both to and from that component). Although a cache is not depicted in certain of the Figures, a cache (e.g., an instruction and/or data cache), may be utilized.

Figures 3A, 3B, 3C:
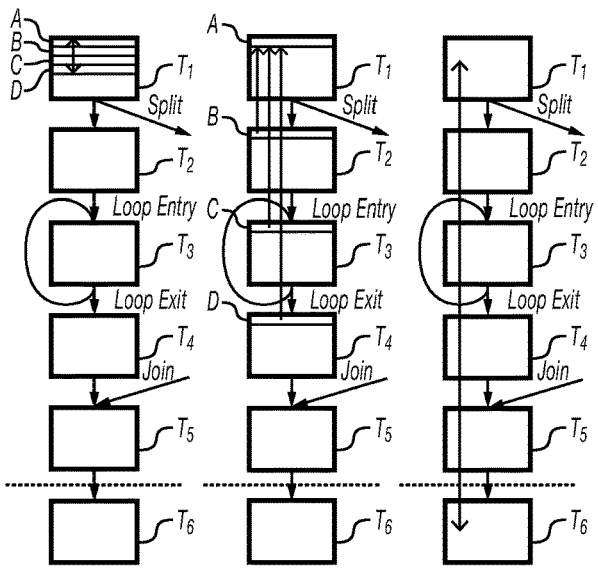
FIGS. 3A-3C illustrate flow diagrams of threads of multiple instructions according to embodiments of the disclosure.

An instruction may be assigned to a logical thread (LT) by a (e.g., dynamic) binary translator. FIGS. 3A-3C illustrate flow diagrams of threads of multiple instructions according to embodiments of the disclosure. A thread may include a plurality of instructions. Each of FIGS. 3A-3C include six (e.g., logical) threads ($T_1$-$T_6$) and each thread may include one or more instructions. Instructions A-D in FIG. 1 are assigned to thread $T_1$. In one embodiment, a hardware scheduler may be an out-of-order scheduler and it may include a small window of less than all of the instructions in a thread, for example, an out-of-order scheduler in FIG. 3A may schedule instructions A-D at a given instant, e.g., but not schedule the other instructions. In one embodiment, a hardware scheduler (e.g., in-order or out-of-order scheduler) may only check each head instruction of logical threads of multiple instructions (e.g., to schedule execution of those instructions and/or their logical threads), for example, a scheduler in FIG. 3B may schedule head instructions A-D at a given instant, e.g., scheduling instructions A-D and/or their threads (T1-T4, respectively). In one embodiment, a hardware scheduler may be an out-of-order scheduler and it may include a large window of all of the instructions in a thread, for example, an out-of-order scheduler in FIG. 3C may schedule instructions of any of threads T1-T6 at a given instant. In one embodiment, an in-order (e.g., execution engine) processor executes instructions (e.g., micro-instructions) out of the source program order (e.g., in the order the machine code instructions are presented to the in-order processor).

Figures 4A, 4B:
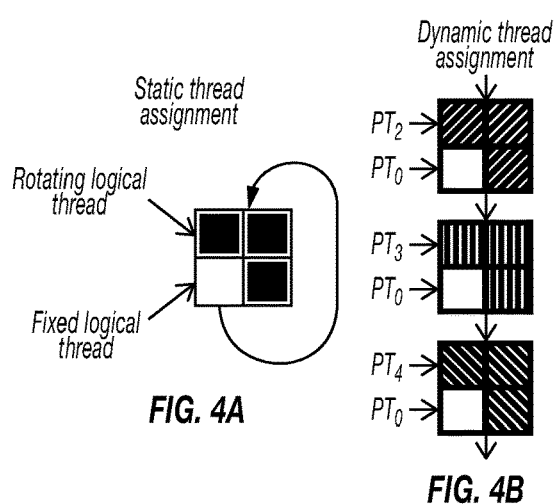
FIG. 4A is a block diagram of static thread assignment according to embodiments of the disclosure.
FIG. 4B is a block diagram of dynamic thread assignment according to embodiments of the disclosure.

FIG. 4A is a block diagram of static thread assignment according to embodiments of the disclosure. A system (e.g., a compiler or a DBT) may perform static logical thread assignment. For example, FIG. 4A schematically illustrates four instructions of a block loop with one of the instructions (the lower left, non-shaded box) being a branch. Certain embodiments of this disclosure may allow a system (e.g., via a DBT) to include a thread map hint for each or all instructions. For example, a thread map hint that indicates a rotating logical instruction (or thread) may be provided for the three shaded box instructions. For example, a thread map hint may indicate execution on a fixed (e.g., non-rotating) logical instruction (or thread). FIG. 4B is a block diagram of dynamic thread assignment according to embodiments of the disclosure. A system (e.g., a scheduler) may receive the thread map hints (e.g., rotating or fixed logical threads from Figure A) and then assign a different (e.g., rotating) physical thread of a processor for an instruction(s) whose corresponding thread map hint indicates it is a rotating logical instruction (or thread) and/or assign a same physical thread (e.g., $PT_0$) of a processor for an instruction(s) whose corresponding thread map hint indicates it is a static logical instruction (or thread).

Figures 5A, 5B:
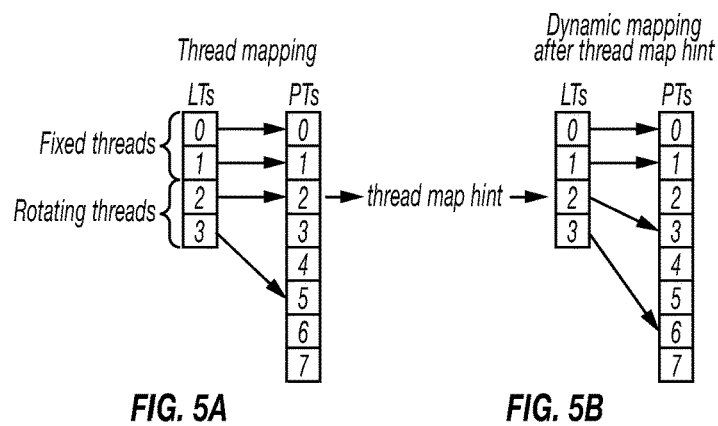
FIG. 5A is a block diagram of thread mapping before a thread map hint according to embodiments of the disclosure.
FIG. 5B is a block diagram of dynamic thread mapping after a thread map hint according to embodiments of the disclosure.

FIG. 5A is a block diagram of thread mapping before a thread map hint according to embodiments of the disclosure. Thread mapping may indicate the physical threads that are to execute a logical thread. A scheduler may perform thread mapping, e.g., based on a thread map hint. FIG. 5A illustrates an example of logical threads being assigned to be executed by (e.g., mapped to a single) physical thread (PT). FIG. 5B is a block diagram of dynamic thread mapping after a thread map hint according to embodiments of the disclosure. A system (e.g., a scheduler) may receive a thread map hint (e.g., from a DBT) and then assign a physical thread of a processor to execute the logical thread based on the thread map hint. For example, a thread map hint for $LT_0$ and $LT_1$ in FIG. 5B may indicate (e.g., to the scheduler) that those logical threads are fixed, e.g., relative to the mapping to $PT_2$ and $PT_5$, respectively, in FIG. 5A. DBT may include a thread map hint when it detects (e.g., during the running of the source or untranslated code) a branch, such as, but not limited to, a loop, a split, or a join. For example, a thread map hint for $LT_2$ and $LT_3$ in FIG. 5B may indicate (e.g., to the scheduler) that those logical threads are non-fixed (e.g., rotating), for example, relative to their mapping in FIG. 5A. Depicted rotation in FIG. 5B maps $LT_2$ to $PT_3$ (instead of $PT_2$ as in FIG. 5A) and maps $LT_3$ to $PT_6$ (instead of $PT_5$ as in FIG. 5A). Rotating may include a physical thread being assigned to the next (e.g., adjacent) physical thread or any available physical thread (e.g., available to the scheduler at assignment time). Non-fixed (e.g., rotating) threads may be scheduled for concurrent execution with other non-fixed threads on their respective PTs. Fixed threads may be scheduled for sequential instruction, e.g., on the same PT.

Figure 6:
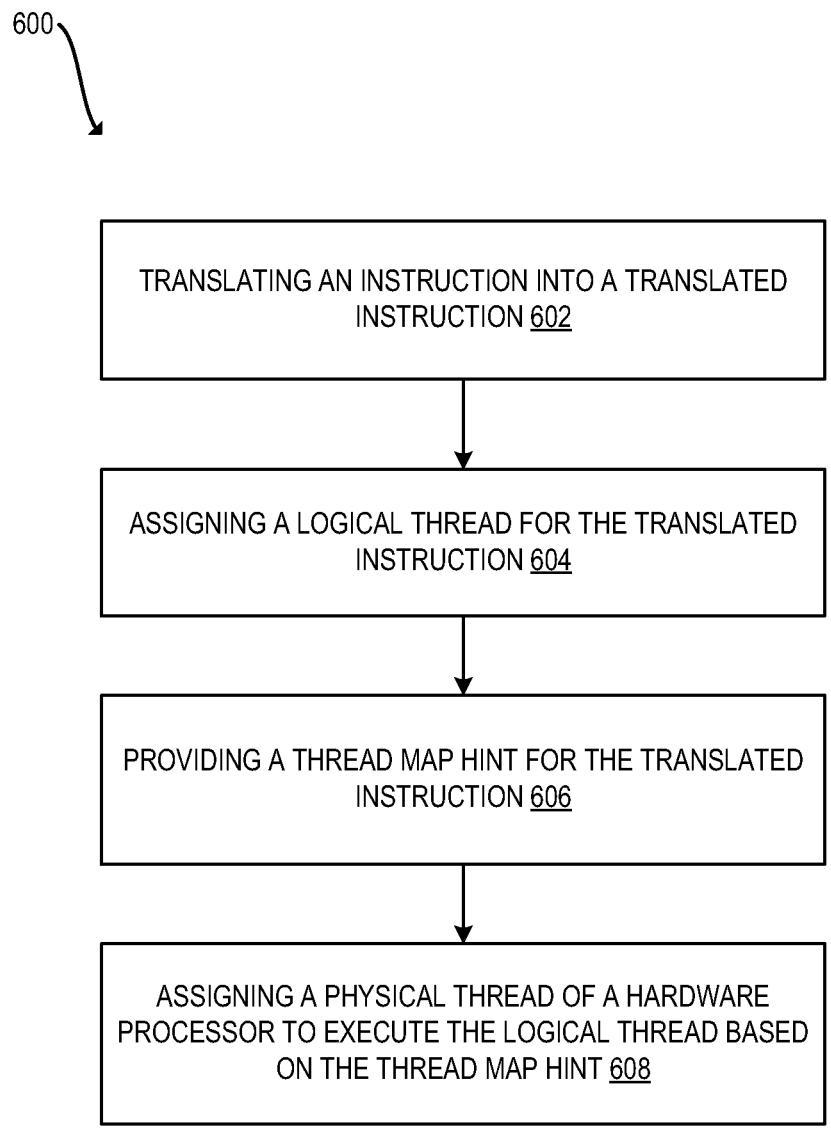
FIG. 6 illustrates a flow diagram of assigning a logical thread to a physical thread according to embodiments of the disclosure.

FIG. 6 illustrates a flow diagram 600 of assigning a logical thread to a physical thread according to embodiments of the disclosure. Depicted flow diagram includes translating an instruction into a translated instruction 602, assigning a logical thread for the translated instruction 604, providing a thread map hint for the translated instruction 606, and assigning a physical thread of a hardware processor to execute the logical thread based on the thread map hint 608.

In one embodiment, the use of a DBT allows the (e.g., logical to physical) thread assignment to be adapted at run time to improve performance. Static techniques may have limited visibility into run time behavior. Certain embodiments herein may dynamically optimize for observed run time behavior. For example, certain embodiments may dynamically adapt based on phases observed at run time. In one embodiment, a (e.g., dynamic) binary translator and a scheduler may cooperate to translate logical threads into physical threads. For different executions of the same code, the same instructions of that code may use different physical threads of a processor even though the instructions were originally assigned to logical threads statically in the code. This may remove false ordering constraints that may arise from a pure software thread assignment (e.g., where instructions in loops would always have the same physical thread assignment and restricting instruction level parallelism (ILP) for repetitive iterations).

In one embodiment, for example, in FIGS. 4A-5B, instructions (or threads including the instructions) may include a thread map hint (e.g., from a DBT) such that rotating logical thread (LT) (e.g., shaded boxes in FIG. 4A) receive a different physical thread (PT) at runtime (e.g., denoted by patterned boxes in FIG. 4B). Certain embodiments herein utilize fixed physical threads, e.g., to guaranty certain execution properties and/or ordering constraints (e.g., so that certain instructions, such as stores, do not execute speculatively).

In one embodiment, a processor utilizes hardware (e.g., a hardware scheduler) and software (e.g., a software DBT) co-designed thread assignment (e.g., assigning code to physical threads) (e.g., micro-threads) to simplify the hardware selection logic. The proposed design may achieve the benefits of out-of-order (e.g., instruction or thread execution) without the complexity of an out-of-order execution engine, etc. In one embodiment, a processor utilizes software (e.g., DBT software) assigned micro threads that capture a wide variety of characteristics, e.g., in comparison to a dependence chain based approach. In one embodiment, a hardware and software co-designed microprocessor that utilizes a dynamic binary translator (DBT). This DBT based approach may include benefits compared to compile time based approaches (e.g., as discussed below).

In one embodiment, after translation and static code scheduling, the software (e.g., DBT) assigns logical threads (LTs), which may be assigned using a variety of policies, such as, but not limited to, those discussed herein. Certain embodiments leverage DBT static (e.g., translation time) code scheduling (e.g., pre-scheduling). Certain scheduling decisions may be easier to make statically (e.g., at translation time) than dynamically (e.g., at run time). Statically made scheduling decisions may be more power efficient, for example, intra-basic block scheduling (e.g., scheduling within a block or thread, such as, but not limited to, within a block $T_1$-$T_6$ in FIGS. 3A-3C). In one embodiment, hardware (e.g., hardware scheduler) may (e.g., only) make (e.g., dynamic) scheduling decisions for code segments where static (e.g., translation time) prediction of behavior is unknown or more difficult (e.g., across basic blocks, as illustrated by the transitions between blocks $T_1$-$T_6$ in FIGS. 3A-3C). Software assigned threads may be desired over (e.g., pure) hardware assigned threads, for example, the software may have more visibility into future and previous instructions (e.g., run time behavior). Software may detect critical path instructions and optimize (e.g., logical) thread assignment to prioritize these instructions. Software may detect dependence chains feeding control flow instructions to prioritize them.

Certain embodiments using a DBT do not use (e.g., require) offline collection of traces to perform a software thread assignment. By avoiding the use of traces, the thread assignments may not be tied to a single input (e.g., not be input sensitive). In certain embodiments, a programmer may not perform an extra step of tracing and/or compilers may not be modified and programs recompiled to support a trace-based solution. In certain embodiments using a DBT, the thread assignment may be adapted at run time to improve performance. Static techniques may have limited visibility into run time behavior. Certain embodiments may optimize performance of the assignment of code to physical threads for an observed run time behavior. Certain embodiments may dynamically adapt based on phases observed at run time.

Software (e.g., software DBT) and hardware (e.g., a hardware scheduler) may cooperate to translate logical threads (LTs) into physical threads (PTs). That is, for different executions of the same code, a processor may use different PTs. This may be useful, for example, for eliminating false ordering constraints that may arise from a pure software thread assignment (e.g., instructions in loops may always have the same physical thread assignment leading to little instruction level parallelism (ILP) across loop iterations). For example, FIGS. 4A-4B demonstrate that for a single basic block loop shown schematically in FIG. 4A as four instructions (e.g., the four boxes indicating four instructions) and those marked with rotating LTs (shaded boxes) receive a different PT at runtime (denoted by the hatched boxes in FIG. 4B). A software and hardware co-designed processor may utilize fixed threads for enabling certain execution properties (e.g., certain instructions, such as stores, not being executed speculatively). For example, FIGS. 4A-4B illustrate that for the single basic block loop shown on the left that the instruction marked with fixed LT (empty box) may receive the same PT at runtime for all its invocations (denoted by the empty box in FIG. 4B).

In certain embodiments, software (e.g., a software DBT) may provide thread map hints to the hardware (e.g., hardware scheduler) to influence the logical thread to physical thread mapping. For example, FIGS. 5A-5B illustrate a sample state for the LT to PT mapping where after a thread map hint is provided from software (e.g., on a branch instruction), the processor may transition to the new mapping shown in FIG. 5B. In this embodiment, both rotating LTs map to different PTs, but the fixed LTs map to the same PTs. Instructions within a thread may be required to execute in-order with respect to other instructions in the same thread, e.g., in an in-order execution unit (engine) of a processor. This embodiment may simplify the hardware scheduler (e.g., selection logic) where it may select from head (e.g., beginning) instructions of each of multiple threads. This embodiment may allow the scheduler to leverage important properties, such as, but not limited to, in-order execution guarantees within threads which may allow further hardware simplifications (e.g., scoreboard structures for dependency tracking may be eliminated in favor of enforcing the correct ordering using fixed threads).

In certain embodiments, instructions may be ready for execution (e.g., for selection by a scheduler for execution) from a head of a thread when their dependencies are satisfied. Dependencies may be considered satisfied when a (e.g., hardware) scoreboarding component detects that producer instructions have issued or an in-order thread may ensure the instructions are ready. For example, if two instructions in the same thread have a one cycle dependence edge between them and the dependent instructions has no other producers, the scoreboarding mechanism may not be utilized.

In one embodiment, an apparatus includes a hardware binary translator to: translate an instruction into a translated instruction, assign a logical thread for the translated instruction, and provide a thread map hint for the translated instruction, and a hardware scheduler to assign a physical thread of a hardware processor to execute the logical thread based on the thread map hint from the hardware binary translator. The instruction may be software binary code and the translated instruction may be hardware binary code. The hardware scheduler may assign a different physical thread for an additional instance of the translated instruction based on the thread map hint. The hardware scheduler may assign the physical thread for an additional instance of the translated instruction based on the thread map hint. The hardware scheduler may only check each head instruction of logical threads of multiple instructions to schedule execution of the logical threads. The hardware binary translator may add the thread map hint as a field of the translated instruction.

In another embodiment, an apparatus includes a data storage device that stores code that when executed by a hardware processor causes the hardware processor to perform the following: translating an instruction into a translated instruction, assigning a logical thread for the translated instruction, and providing a thread map hint for the translated instruction, and a hardware scheduler to assign a physical thread of the hardware processor to execute the logical thread based on the thread map hint. The instruction may be software binary code and the translated instruction may be hardware binary code. The data storage device may further store code that when executed by the hardware processor causes the hardware processor to perform the following: assigning a different physical thread for an additional instance of the translated instruction based on the thread map hint. The data storage device may further store code that when executed by the hardware processor causes the hardware processor to perform the following: assigning the physical thread for an additional instance of the translated instruction based on the thread map hint. The hardware scheduler may only check each head instruction of logical threads of multiple instructions to schedule execution of the logical threads. The data storage device may further store code that when executed by the hardware processor causes the hardware processor to perform the following: adding the thread map hint as a field of the translated instruction.

In yet another embodiment, a method includes translating an instruction into a translated instruction, assigning a logical thread for the translated instruction, providing a thread map hint for the translated instruction, and assigning a physical thread of a hardware processor to execute the logical thread based on the thread map hint. The instruction may be software binary code and the translated instruction may be hardware binary code. The method may include assigning a different physical thread for an additional instance of the translated instruction based on the thread map hint. The method may include assigning the physical thread for an additional instance of the translated instruction based on the thread map hint. The method may include only checking each head instruction of logical threads of multiple instructions to schedule execution of the logical threads. The providing the thread map hint for the translated instruction comprises adding the thread map hint as a field of the translated instruction.

In another embodiment, an apparatus includes a hardware processor to execute a plurality of physical threads, and a data storage device that stores code that when executed by the hardware processor causes the hardware processor to perform the following: translating an instruction into a translated instruction, assigning a logical thread for the translated instruction, providing a thread map hint for the translated instruction, and assigning a physical thread of the hardware processor to execute the logical thread based on the thread map hint. The instruction may be software binary code and the translated instruction may be hardware binary code. The data storage device may further store code that when executed by the hardware processor causes the hardware processor to perform the following: assigning a different physical thread for an additional instance of the translated instruction based on the thread map hint. The data storage device may further store code that when executed by the hardware processor causes the hardware processor to perform the following: assigning the physical thread for an additional instance of the translated instruction based on the thread map hint. The data storage device may further store code that when executed by the hardware processor causes the hardware processor to perform the following: only checking each head instruction of logical threads of multiple instructions to schedule execution of the logical threads. The data storage device may further store code that when executed by the hardware processor causes the hardware processor to perform the following: wherein the providing the thread map hint for the translated instruction comprises adding the thread map hint as a field of the translated instruction.

In yet another embodiment, an apparatus includes means to translate an instruction into a translated instruction, means to assign a logical thread for the translated instruction, means to provide a thread map hint for the translated instruction, and means to assign a physical thread of a hardware processor to execute the logical thread based on the thread map hint. A hardware binary translator may only provide a thread map hint for each head logical thread of blocks of multiple logical threads. A data storage device may further store code that when executed by the hardware processor causes the hardware processor to perform the following: only providing a thread map hint for each head logical thread of blocks of multiple logical threads. A method may include only providing a thread map hint for each head logical thread of blocks of multiple logical threads. A data storage device may further store code that when executed by the hardware processor causes the hardware processor to perform the following: only providing a thread map hint for each head logical thread of blocks of multiple logical threads. An apparatus to assign a logical thread to a physical thread may be as described in the detailed description. A method for assigning a logical thread to a physical thread may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 7A is a block diagram illustrating both an exemplary in-order pipeline and an exemplary register renaming, outof-order issue/execution pipeline according to embodiments of the disclosure. FIG. 7B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the disclosure. In one embodiment, an instruction decode unit 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the disclosure may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the disclosure. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Figure 9:
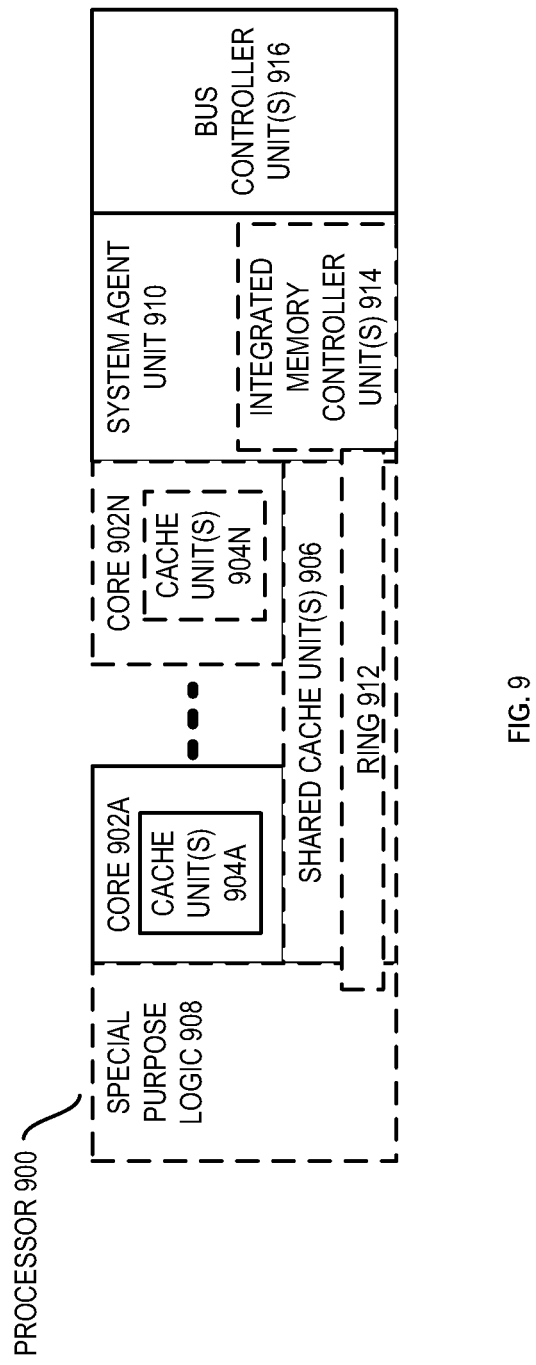
FIG. 9 is a block diagram of a processor that may have more than one core, may have an integrated memory controller, and may have integrated graphics according to embodiments of the disclosure.

FIG. 9 is a block diagram of a processor 900 that may have more than one core, may have an integrated memory controller, and may have integrated graphics according to embodiments of the disclosure. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
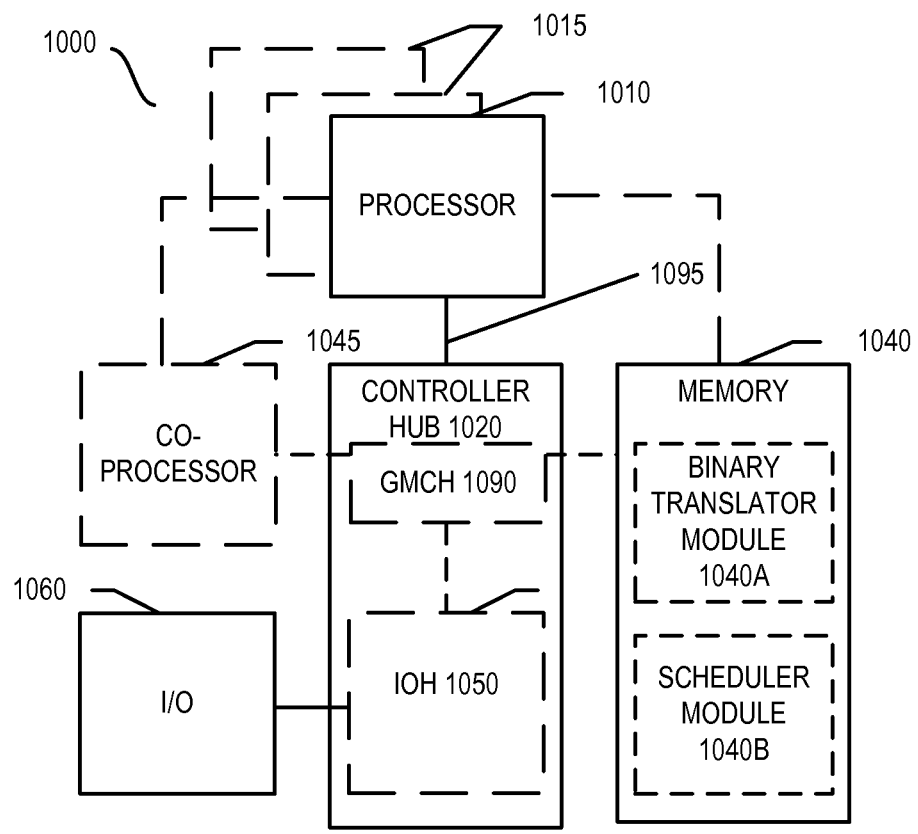
FIG. 10 is a block diagram of a system in accordance with one embodiment of the present disclosure.

Referring now to FIG. 10, shown is a block diagram of a system 1000 in accordance with one embodiment of the present disclosure. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050. Memory 1040 may include a module to store code that when executed causes a processor to perform any method of this disclosure. Memory 1040 may include a binary translator module 1040A, for example, to store code that when executed causes a processor to translate an instruction into a translated instruction, assign a logical thread for the translated instruction, provide a thread map hint for the translated instruction, or any combination thereof. Memory 1040 may include a scheduler module 1040B, for example, to store code that when executed causes a processor to assign a physical thread of a hardware processor to execute a logical thread based on a thread map hint.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
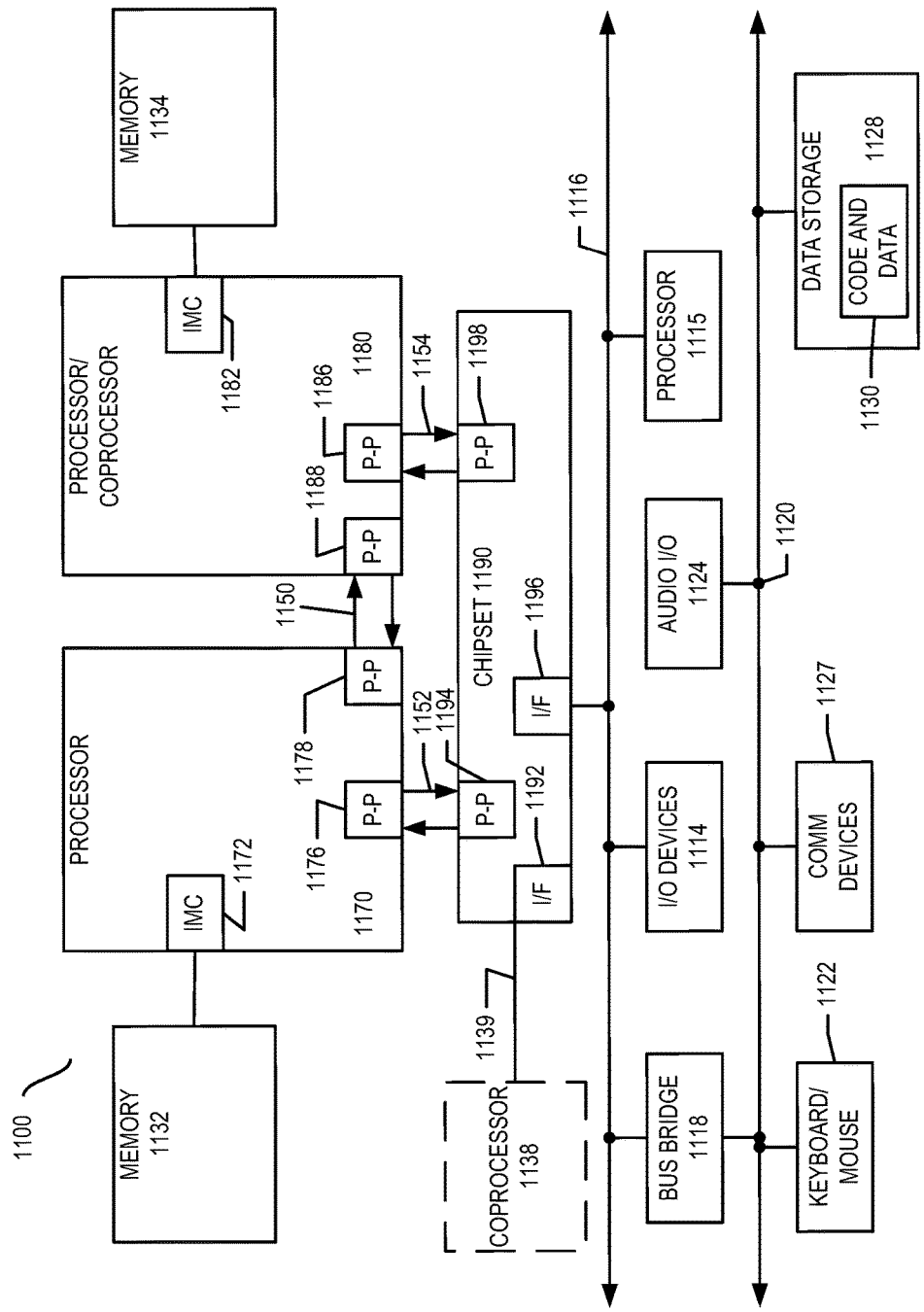
FIG. 11 is a block diagram of a more specific exemplary system in accordance with an embodiment of the present disclosure.

Referring now to FIG. 11, shown is a block diagram of a first more specific exemplary system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the disclosure, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
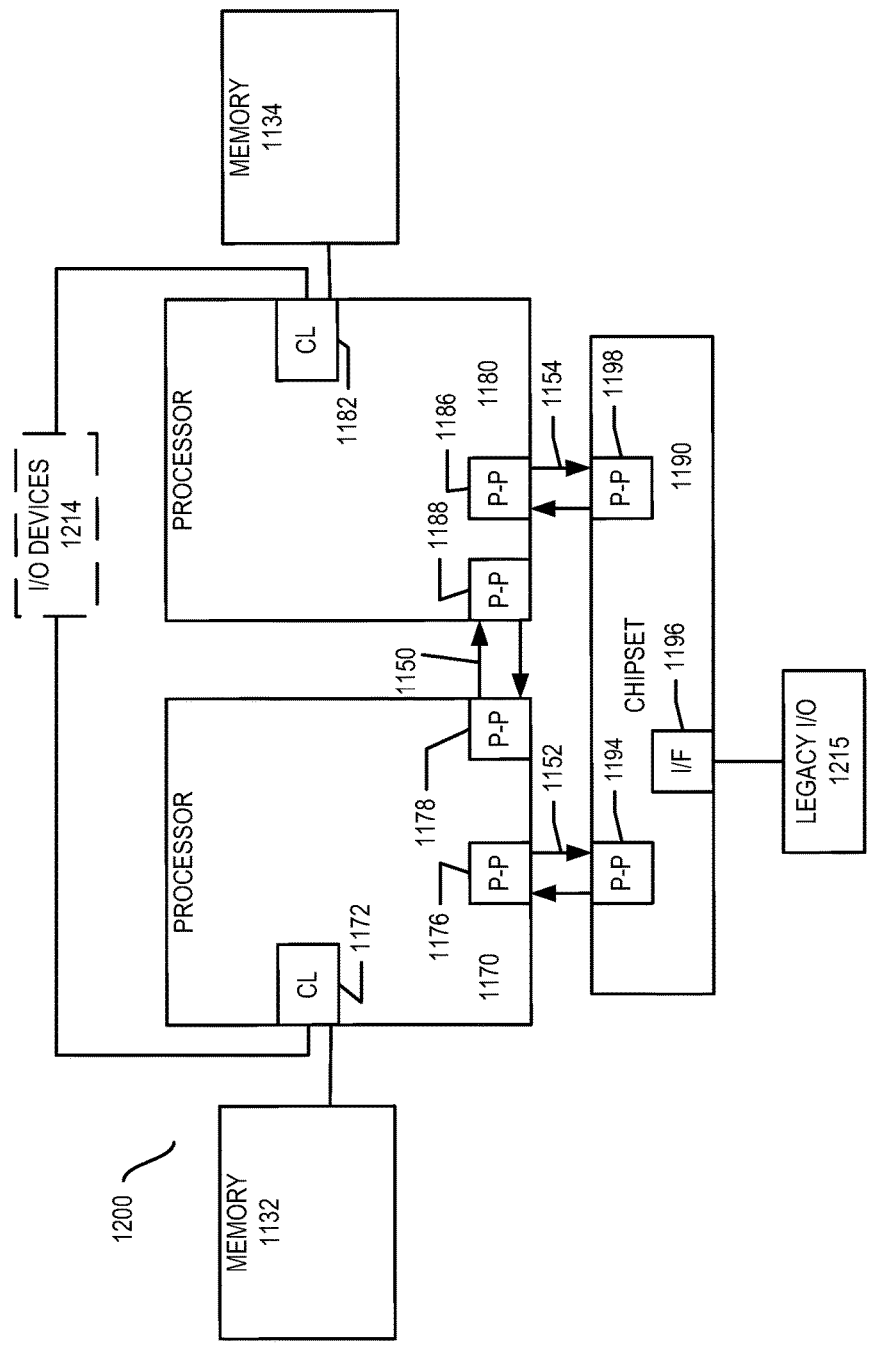
FIG. 12, shown is a block diagram of a second more specific exemplary system in accordance with an embodiment of the present disclosure.

Referring now to FIG. 12, shown is a block diagram of a second more specific exemplary system 1200 in accordance with an embodiment of the present disclosure. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
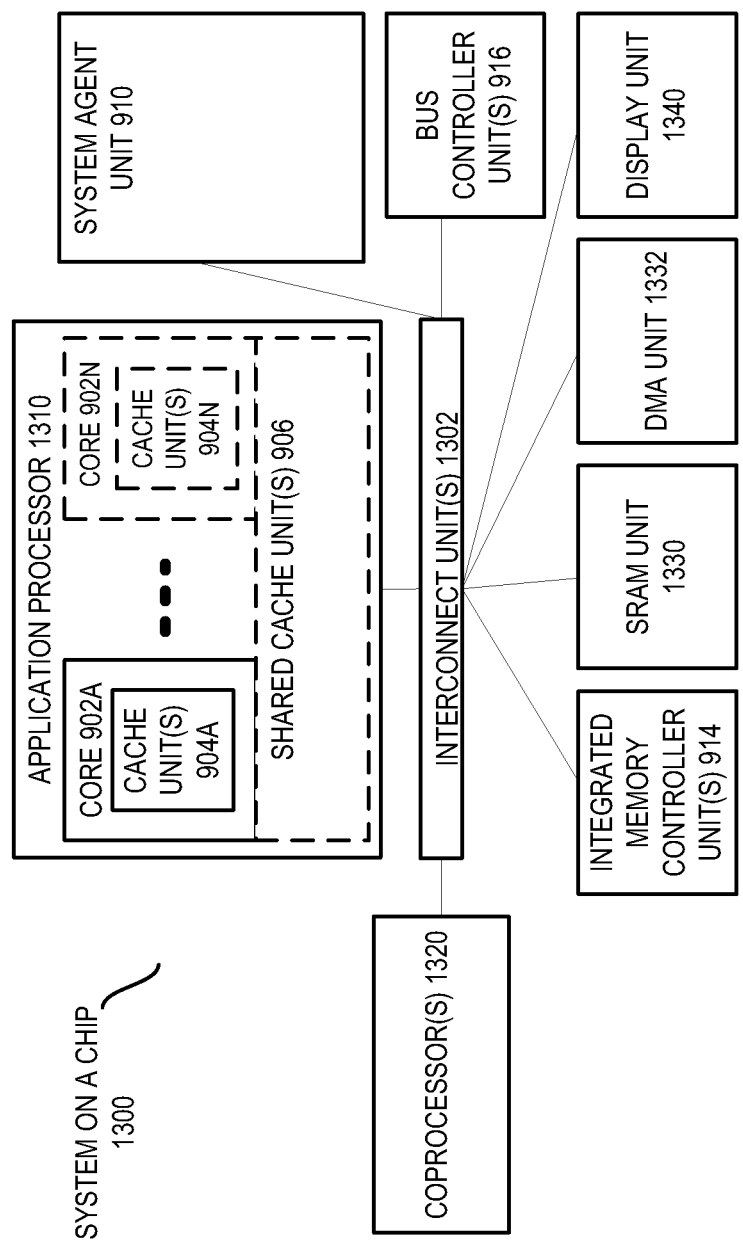
FIG. 13, shown is a block diagram of a system on a chip (SoC) in accordance with an embodiment of the present disclosure.

Referring now to FIG. 13, shown is a block diagram of a SoC 1300 in accordance with an embodiment of the present disclosure. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including binary translation, code morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
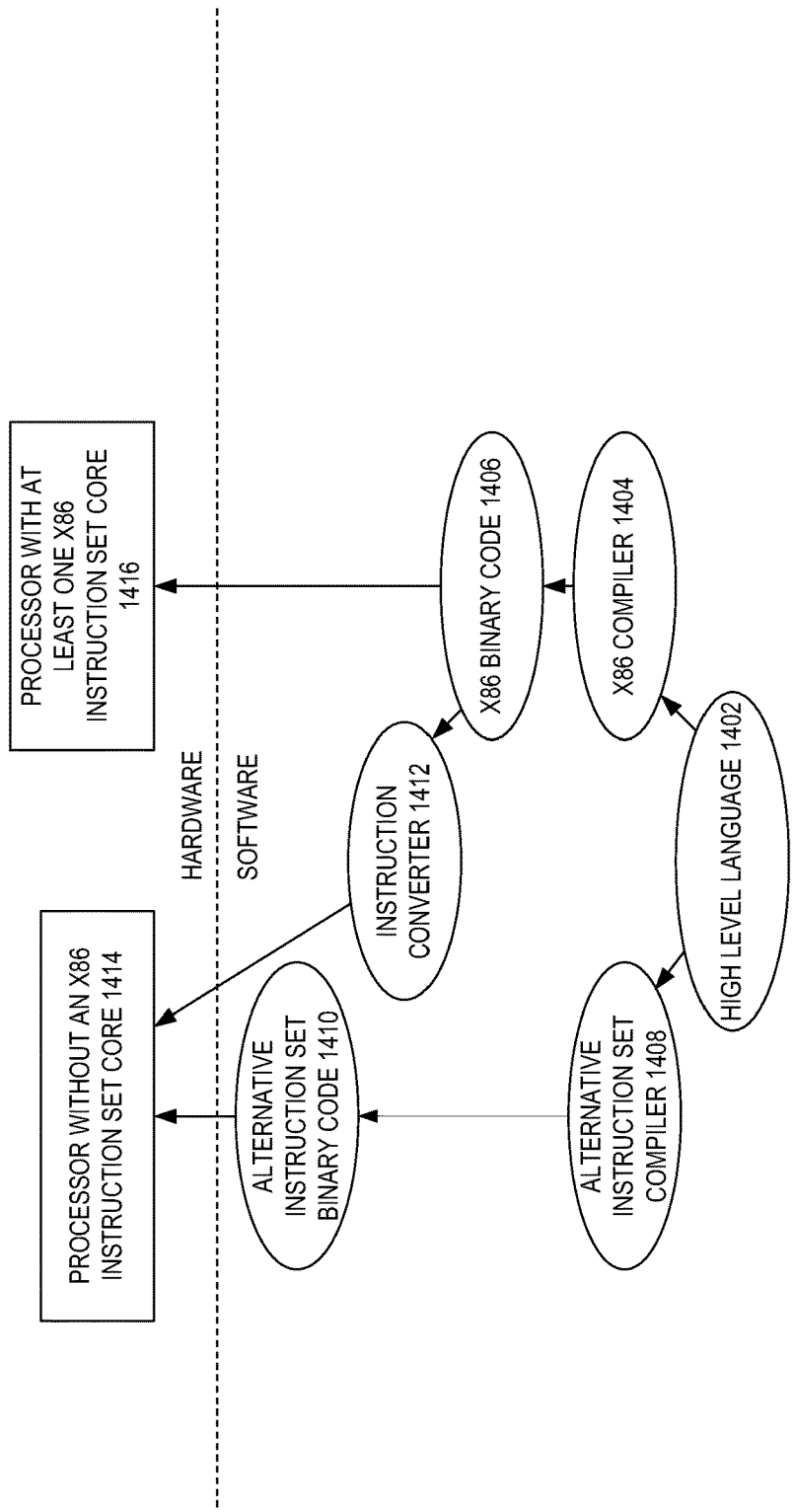
FIG. 14 is a block diagram contrasting the use of a software instruction converter to convert binary instructions in a source instruction set to binary instructions in a target instruction set according to embodiments of the disclosure.

FIG. 14 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

What is claimed is:

1. An apparatus comprising:
    a hardware binary translator to:
        binary translate an instruction of a first instruction set architecture into a translated instruction of a second instruction set architecture,
        assign a logical thread for the translated instruction, and
        provide a thread map hint for the translated instruction; and
    a hardware scheduler to assign a physical thread of a hardware processor to execute the logical thread based on the thread map hint from the hardware binary translator.

2. The apparatus of claim 1, wherein the instruction is a decoded instruction that is output from a decoder of the hardware processor into the hardware binary translator.

3. The apparatus of claim 1, wherein the hardware scheduler is to assign the physical thread to execute a first instance of the translated instruction in a loop based on the thread map hint, and assign a different physical thread to execute an additional instance of the translated instruction in the loop based on the thread map hint.

4. The apparatus of claim 1, wherein the hardware scheduler is to assign the physical thread to execute a first instance of the translated instruction in a loop based on the thread map hint, and assign the physical thread to execute an additional instance of the translated instruction in the loop based on the thread map hint.

5. The apparatus of claim 1, wherein the hardware scheduler is to only check each head instruction of logical threads of multiple instructions to schedule execution of the logical threads.

6. The apparatus of claim 1, wherein the hardware binary translator is to add the thread map hint as a field of the translated instruction.

7. An apparatus comprising:
    a data storage device that stores code that when executed by a hardware processor causes the hardware processor to perform the following:
        binary translating an instruction of a first instruction set architecture into a translated instruction of a second instruction set architecture,
        assigning a logical thread for the translated instruction, and
        providing a thread map hint for the translated instruction; and
    a hardware scheduler to assign a physical thread of the hardware processor to execute the logical thread based on the thread map hint.

8. The apparatus of claim 7, wherein the instruction is a decoded instruction that is output from a decoder of the hardware processor for the binary translating.

9. The apparatus of claim 7, wherein the data storage device further stores code that when executed by the hardware processor causes the hardware processor to perform the following:
    assigning the physical thread to execute a first instance of the translated instruction in a loop based on the thread map hint, and
    assigning a different physical thread to execute an additional instance of the translated instruction in the loop based on the thread map hint.

10. The apparatus of claim 7, wherein the data storage device further stores code that when executed by the hardware processor causes the hardware processor to perform the following:
    assigning the physical thread to execute a first instance of the translated instruction in a loop based on the thread map hint; and
    assigning the physical thread to execute an additional instance of the translated instruction in the loop based on the thread map hint.

11. The apparatus of claim 7, wherein the hardware scheduler is to only check each head instruction of logical threads of multiple instructions to schedule execution of the logical threads.

12. The apparatus of claim 7, wherein the data storage device further stores code that when executed by the hardware processor causes the hardware processor to perform the following:
    adding the thread map hint as a field of the translated instruction.

13. A method comprising:
    binary translating an instruction of a first instruction set architecture into a translated instruction of a second instruction set architecture;
    assigning a logical thread for the translated instruction;
    providing a thread map hint for the translated instruction; and
    assigning a physical thread of a hardware processor to execute the logical thread based on the thread map hint.

14. The method of claim 13, wherein the instruction is a decoded instruction that is output from a decoder of the hardware processor for the binary translating.

15. The method of claim 13, further comprising assigning the physical thread to execute a first instance of the translated instruction in a loop based on the thread map hint, and assigning a different physical thread to execute an additional instance of the translated instruction in the loop based on the thread map hint.

16. The method of claim 13, further comprising assigning the physical thread to execute a first instance of the translated instruction in a loop based on the thread map hint, and assigning the physical thread to execute an additional instance of the translated instruction in the loop based on the thread map hint.

17. The method of claim 13, further comprising only checking each head instruction of logical threads of multiple instructions to schedule execution of the logical threads.

18. The method of claim 13, wherein the providing the thread map hint for the translated instruction comprises adding the thread map hint as a field of the translated instruction.

19. An apparatus comprising:
a hardware processor to execute a plurality of physical threads; and
a data storage device that stores code that when executed by the hardware processor causes the hardware processor to perform the following:
binary translating an instruction of a first instruction set architecture into a translated instruction of a second instruction set architecture,
assigning a logical thread for the translated instruction,
providing a thread map hint for the translated instruction, and
assigning a physical thread of the hardware processor to execute the logical thread based on the thread map hint.

20. The apparatus of claim 19, wherein the instruction is a decoded instruction that is output from a decoder of the hardware processor for the binary translating.

21. The apparatus of claim 19, wherein the data storage device further stores code that when executed by the hardware processor causes the hardware processor to perform the following:
assigning the physical thread to execute a first instance of the translated instruction in a loop based on the thread map hint; and
assigning a different physical thread to execute an additional instance of the translated instruction in the loop based on the thread map hint.

22. The apparatus of claim 19, wherein the data storage device further stores code that when executed by the hardware processor causes the hardware processor to perform the following:
assigning the physical thread to execute a first instance of the translated instruction in a loop based on the thread map hint; and
assigning the physical thread to execute an additional instance of the translated instruction in the loop based on the thread map hint.

23. The apparatus of claim 19, wherein the data storage device further stores code that when executed by the hardware processor causes the hardware processor to perform the following:
only checking each head instruction of logical threads of multiple instructions to schedule execution of the logical threads.

24. The apparatus of claim 19, wherein the data storage device further stores code that when executed by the hardware processor causes the hardware processor to perform the following:
wherein the providing the thread map hint for the translated instruction comprises adding the thread map hint as a field of the translated instruction.

* * * * *